US 7,629,784 B2

(12) United States Patent
Müller (10) Patent No.: US 7,629,784 B2
(45) Date of Patent: Dec. 8, 2009

(54) VOLTAGE SUPPLY ARRANGEMENT AND METHOD FOR PRODUCTION OF ELECTRICAL POWER

(75) Inventor: Jan-Erik Müller, Ottobrunn (DE)

(73) Assignee: Infineon Technologies AG, Munich (DE)

(*) Notice: Subject to any disclaimer, the term of this patent is extended or adjusted under 35 U.S.C. 154(b) by 134 days.

(21) Appl. No.: 11/413,423

(22) Filed: Apr. 28, 2006

(65) Prior Publication Data
US 2006/0290203 A1 Dec. 28, 2006

(30) Foreign Application Priority Data
May 2, 2005 (DE) .................. 10 2005 020 314

(51) Int. Cl.
*G05F 1/00* (2006.01)
*H02J 1/10* (2006.01)
(52) U.S. Cl. .................. 323/283; 323/222; 307/29
(58) Field of Classification Search .......... 323/222, 323/228, 266, 267, 283, 284, 298; 307/11, 307/28, 29, 30, 38, 41
See application file for complete search history.

(56) References Cited

U.S. PATENT DOCUMENTS

| 5,239,275 | A | | 8/1993 | Leitch | |
|---|---|---|---|---|---|
| 5,570,003 | A | * | 10/1996 | Zimmermann | 323/284 |
| 5,959,439 | A | * | 9/1999 | Shenai et al. | 323/222 |
| 6,031,362 | A | | 2/2000 | Bradley | |
| 6,232,753 | B1 | * | 5/2001 | Pasotti et al. | 323/267 |
| 7,215,517 | B2 | * | 5/2007 | Takamatsu | 361/18 |
| 2003/0025465 | A1 | * | 2/2003 | Swanson et al. | 315/291 |
| 2003/0030326 | A1 | * | 2/2003 | Shenai et al. | 307/21 |
| 2004/0004465 | A1 | * | 1/2004 | McGinnis | 323/267 |
| 2004/0017111 | A1 | * | 1/2004 | May | 307/31 |
| 2005/0062563 | A1 | * | 3/2005 | Grundl et al. | 335/2 |

OTHER PUBLICATIONS

"High-Efficiency Power Amplifier Using Dynamic Power-Supply Voltage for CDMA Applications", Gary Hanington, Pin-Fan Chen, Peter M. Asbeck and Lawrence E. Larson, IEEE Transactions on Microwave Theory and Techniques, vol. 47, No. 8, Aug. 1999, pp. 1471-1476.

(Continued)

*Primary Examiner*—Edward Tso
*Assistant Examiner*—M'Baye Diao
(74) *Attorney, Agent, or Firm*—Eschweiler & Associates, LLC (57) ABSTRACT

A voltage supply arrangement is proposed, which provides a voltage from a first power range in a first operating mode and from a second power range in a second operating mode, to a first electrical load. The voltage supply arrangement includes a voltage converter which is coupled on the input side to a voltage input of the voltage supply arrangement and on the output side to a first connection of a first switch, which is connected at a second connection to a voltage output of the voltage supply arrangement for connection of a first electrical load. The voltage supply arrangement further includes a second switch, which is coupled at a first connection to the voltage input and at a second connection to the voltage output, and a drive circuit, which is configured to set the first and the second switch to the first or the second operating mode in response to a control signal.

36 Claims, 6 Drawing Sheets

OTHER PUBLICATIONS

"Efficiency Improvement Techniques at Low Power Levels for Linear CDMA and WCDMA Power Amplifiers", Thomas Fowler, Kerry Burger, Nai-Shuo Chend, Apostolos Samelis, EDE Enobakhare and Stephan Rohlfing, 2002 IEEE Radio Frequency Integrated Circuits Symposium, pp. 41-44.

Maxim "WCDMA Cellular Phone 600mA Buck Regulators", MAX1820/MAX1821, printed from the Internet at: www.maxim-uc.com.

* cited by examiner

VOLTAGE SUPPLY ARRANGEMENT AND METHOD FOR PRODUCTION OF ELECTRICAL POWER

REFERENCE TO RELATED APPLICATIONS

This application claims the benefit of the priority date of German application DE 10 2005 020 314.0, filed on May 2, 2005, the contents of which are herein incorporated by reference in their entirety.

FIELD OF THE INVENTION

The present invention relates to a voltage supply arrangement for supplying a first electrical load selectively in a first or in a second power range, and to a method for production of electrical power for the first electrical load.

BACKGROUND OF THE INVENTION

A voltage supply arrangement is used, for example, in the field of wireless communication devices in order to supply a power amplifier as an electrical load. The trend in modern mobile telephones to future multifunctional mobile communication appliances, with speech to multimedia capability, for multiband and multistandard operation requires the use of linear modulation types which are efficient over a broad bandwidth.

The linear modulation types result in linearity requirements for the power amplifier. Further requirements for the power amplifier result from the desire to achieve a long battery operating time. Since the power amplifier represents a major component of the total power consumption of wireless communications devices, high energy utilization efficiency is thus necessary.

The energy efficiency may be improved if the magnitude of the operating voltage of the power amplifier is matched to the required output power. This may be achieved by means of a switched-mode regulator or a voltage converter which converts the battery voltage to a variable supply voltage, with which the power amplifier is operated.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

A voltage supply arrangement which can be operated in a first or in a second operating mode and is configured to provide a voltage from a first power range in the first operating mode and from a second power range in the second operating mode to a first electrical load comprises a voltage converter whose input side is coupled to a voltage input of the voltage supply arrangement in order to supply an input voltage and at a voltage converter output to a first connection of a first switch. Furthermore, the voltage supply arrangement comprises the first switch, which is coupled at a second connection to a voltage output of the voltage supply arrangement for connection of a first electrical load, and a second switch, which is coupled at a first connection to the voltage input of the voltage supply arrangement and at a second connection to the voltage output of the voltage supply arrangement. The voltage supply arrangement also comprises a drive circuit, which has at least one drive circuit input for supplying at least one control signal, is coupled at a first output to a control input of the first switch and at a second output to a control input of the second switch, and is configured to drive the first and the second switch in response to the at least one control signal. The voltage supply arrangement can supply an electrical load with voltage in various power ranges, and can operate on an energy-efficient basis in the process.

A transmission arrangement comprises a voltage supply arrangement, a modulator, to one input of which a payload signal to be transmitted can be supplied and which is configured to provide a modulated signal at one output, a transmission amplifier, to one input of which the output signal from the modulator can be supplied and which comprises the power amplifier and an output for emission of the signal to be transmitted, and an antenna, one input of which is connected to the output of the transmission amplifier, and which is configured for transmission of the signal.

In accordance with one method of the present invention, a voltage is produced for an electrical load in a first or in a second power range. In this case, for example, an input voltage is provided at a voltage input and is coupled to an input of a clocked DC/DC voltage converter and to a first connection of a second switch. A voltage at the input of the voltage converter is converted to a voltage at a voltage converter output by means of the voltage converter, which is coupled at the voltage converter output to a first connection of a first switch. The first and the second switch are driven in response to at least one control signal such that the second switch is open and the first switch is closed in order to produce a voltage in the first power range, and the first switch is open and the second switch is closed in order to produce a voltage in the second power range. This is accomplished in such a manner that the first electrical load is supplied with an output voltage at a voltage output which is coupled to a second connection of the first switch and to a second connection of the second switch and is used for connection of the first electrical load.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

One or more implementations of the present invention will now be described with reference to the attached drawings, wherein like reference numerals are used to refer to like elements throughout, and wherein the illustrated structures are not necessarily drawn to scale.

According to one embodiment, the invention provides a voltage supply arrangement having two operating modes. In the first operating mode, the voltage supply arrangement can provide an output voltage from a first power range, and in the second operating mode it can provide an output voltage from a second power range, to a first electrical load.

The voltage supply arrangement comprises the voltage input for supplying the input voltage. This input voltage can be converted by the voltage converter to a voltage which is available at the voltage converter output.

The voltage input of the voltage supply arrangement and the voltage converter output of the voltage converter are each coupled to a switch. For example, the voltage converter output is coupled to the first connection of the first switch, and the voltage input of the voltage supply arrangement is coupled to the first connection of the second switch.

The second connection of the first switch and the second connection of the second switch are coupled to the voltage output of the voltage supply arrangement. The first electrical load can be connected to this voltage output. The drive circuit can be supplied with the at least one control signal. The drive circuit is configured to select the first and the second operating mode in response to the control signal, and to drive the first and the second switch appropriately.

The voltage converter is configured for the first power range. When this power range is required for operation of the first electrical load, then the first operating mode can be selected by the drive circuit setting the first switch to a closed state and the second switch to an open state. When a power range outside the first power range is required, then the second operating mode can be selected by the drive circuit. In this operating mode, the second switch is set to be closed and the first switch is set to be open, so that the first electrical load is connected directly to the input voltage.

One advantage of this embodiment of the voltage supply arrangement is that the first electrical load is linked to the voltage input and is operated with the aid of the input voltage when the first electrical load requires a power of a magnitude which this energy source can supply. Thus, no voltage converter is connected in between, so that the electrical power losses are extremely low.

When the electrical first load requires an electrical power in a different power range, then the voltage which is required by the first electrical load is provided by the voltage converter. The voltage converter can be configured for this power range. This voltage supply arrangement thus makes very efficient use of the input voltage, and a supply in two power ranges is made available to the first electrical load.

Since only two switches and one circuit for driving the two switches are required for operation in addition to the voltage converter, which is generally present in appliances such as these, this voltage supply arrangement can be highly cost-efficient.

Alternatively, the first switch can be arranged on an input side of the voltage converter, instead of an output side of the voltage converter. As an alternative to the first switch on the output side or the input side of the voltage converter, the voltage converter can also be configured such that it can be switched off by a means for activation/deactivation, such as by using a multiplexer, a switch selector, or a drive circuit.

In one embodiment, the voltage converter may take the form of a clocked DC/DC converter. The voltage converter may, for example, be configured to provide a predetermined constant voltage at the voltage converter output.

The voltage supply arrangement may be configured such that the first switch is closed in the first operating mode and the second switch is closed in the second operating mode, with the other switch in each case being open. The voltage supply arrangement is, for example, configured such that the first switch and the second switch are not closed at the same time.

The voltage converter may be configured to provide a voltage in the first power range, with the voltages in the first power range being lower than the voltages in the second power range, in one example. The electrical power in the second power range can then be provided from the energy source which is connected to the voltage input of the voltage supply arrangement. The output voltage of the voltage converter is in this embodiment less than the input voltage of the voltage supply arrangement. The voltage converter may for this purpose comprise a step-down converter.

Figure 1:
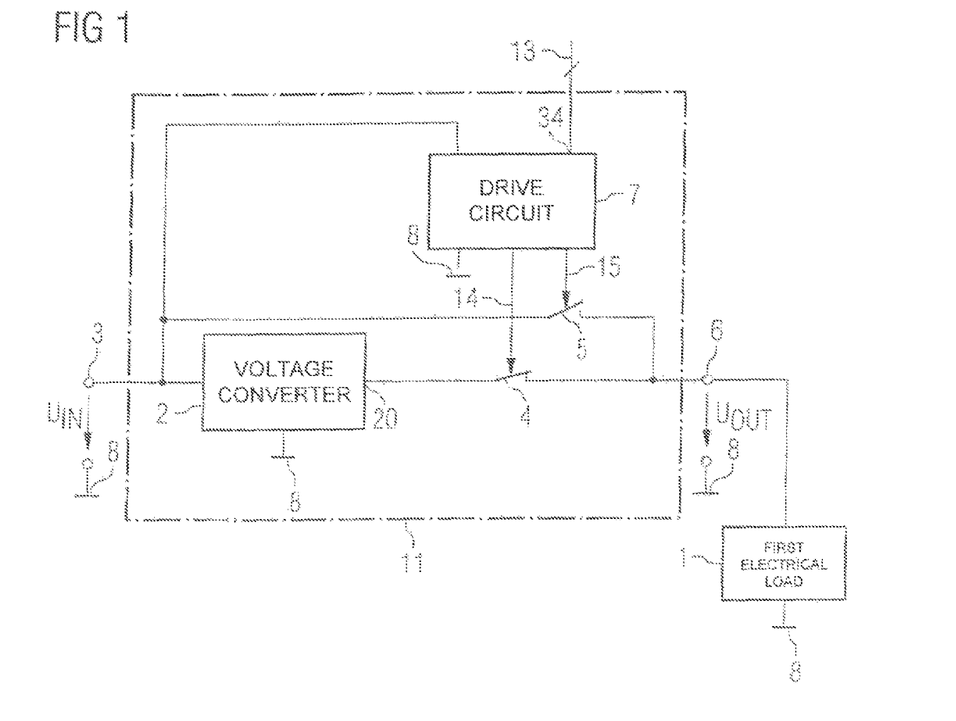
FIG. 1 illustrates a simplified schematic diagram of an example of a voltage supply arrangement for supplying a first electrical load.

FIG. 1 shows one exemplary embodiment of a voltage supply arrangement 11 for supplying a first electrical load 1. A voltage converter 2 is connected at one input to a voltage input 3 of the voltage supply arrangement 11. The voltage converter 2 converts the input voltage at the voltage input 3 of the voltage supply arrangement 11 to a voltage converter output voltage, which is produced at the voltage converter output 20.

A voltage output 6 of the voltage supply arrangement 11 is connected by means of a first switch 4 to the voltage converter output 20 of the voltage converter 2, and by means of a second switch 5 to the voltage input 3 of the voltage supply arrangement 11. The first electrical load 1 is connected to the voltage output 6. A drive circuit 7 is used to set the first and the second switch 4, 5.

The voltage converter 2, the drive circuit 7 and the first electrical load 1 are connected to a reference ground potential connection 8. The drive circuit 7 is connected via a first switch control line 14 to a control input of the first switch 4, and via a second switch control line 15 to a control input of the second switch 5. The drive circuit 7 is connected to the voltage input 3 for the power supply, and is supplied at its drive circuit input 34 with a control signal, by means of a signal line 13, in order to preset the setting of the two switches 4, 5.

Depending on the control signal, the drive circuit 7 switches the first or the second switch 4, 5 to a closed state, and the respective other switch 4, 5 to an open state. When the first switch 4 is closed, the first electrical load 1 is supplied by the voltage converter 2. When the second switch 5 is closed, the first electrical load is supplied by the input voltage.

The output voltage is thus produced in an energy-efficient manner in two different power ranges for the first electrical load 1. The voltage converter may be configured specifically for the requirements of the voltage supply in only one power range, and thus occupies only a small area by comparison to a voltage converter that is operable to supply the first and the second power range.

The electrical load may comprise a power amplifier which is connected to the voltage output. The drive circuit may, in one embodiment, be configured to supply the power amplifier in the second operating mode for high transmission powers and in the first operating mode for transmission powers which are low in comparison with the second operating mode. For example, a typical voltage at the voltage output is about 3.5 volts for the second power range, and is about 1 volt for the first power range.

In one example embodiment, a battery is coupled to the voltage input of the voltage supply arrangement. The battery may be a battery which can be used only once. The battery may be a rechargeable battery.

The drive circuit, in one embodiment, is coupled at two outputs and by means of a first and a second switch control line to the first and the second switch, in order to drive the first and the second switch. In another embodiment, the drive circuit comprises at least one drive circuit input for reception of the control signals in digital form, a digital part for processing of the control signals, an analog part for level conversion to analog signals, and two outputs for supply of analog signals by means of the first and the second switch control line to the first and the second switch. In a further embodiment, it has at least one drive circuit input for reception of the control signals in analog form. In another embodiment, the drive circuit comprises two outputs for emission of digital signals by means of the first and the second switch control line to the first and the second switch, which in this embodiment are configured for processing digital signals.

In an application in a wireless communication device, the second switch may be set to a closed state and the first switch to an open state, in order to couple the power amplifier to the voltage input of the voltage supply arrangement for transmission based on the Global System for Mobile Communication method, the GSM method for short. Further, the first switch can be set to a closed state and the second switch to an open state in order to couple the power amplifier to the voltage converter output for transmission using the Wideband Code Division Multiple Access method, the W-CDMA method for short. The power amplifier can thus be supplied with a voltage which can be provided from the battery for the GSM method, and with a lower voltage than the voltage which can be provided from the battery for the W-CDMA method. One advantage of the voltage supply arrangement is that the gain linearity is improved by supplying the power amplifier with different voltages.

The voltage supply arrangement may have an additional or second voltage output, which is connected directly to the voltage converter output for operation of a second electrical load.

The voltage supply arrangement may have at least one additional voltage output, which is coupled to at least one additional or second voltage converter output and is used for connection of at least one third of the electrical load, which is supplied with a voltage whose magnitude differs from the magnitude of the voltage at the voltage converter output.

In another embodiment, the voltage supply arrangement may have at least one additional output, which is coupled to an additional output of the voltage converter and provides voltages which differ from the voltage at the voltage converter output or voltage converter additional output on the basis of characteristics such as noise, harmonic content, internal resistance, driver capability, fluctuation width or temperature stability.

A third operating mode can be provided, with a third power range, in which no energy is made available at the voltage output of the voltage supply arrangement to the first electrical load. The first electrical load can thus be switched off. The drive circuit may be configured to select the third operating mode by setting both switches to the open position.

In another embodiment, the drive circuit may be configured to identify an overload of the first electrical load, for example, using an overload detector, and to open the first or the second switch in the event of this overload. A characteristic of overloading of the first electrical load may be an excessively high temperature of the first electrical load. The overload may be caused by an excessively high current flow through the first electrical load, or by an excessively high voltage across the first electrical load. Further characteristic features of overloading may thus be an excessively high current flow or an excessively high voltage. The voltage supply arrangement may thus be configured to determine the temperature of the first electrical load, the current flowing through the voltage output and/or the voltage at the voltage output, and to supply the value determined in this way in response to the temperature of the current and/or of the voltage to the drive circuit in order to change the switch settings.

If the second switch, which is configured to supply the first electrical load with an electrical power in the higher power range, is closed before the occurrence of the overload, then the drive circuit can be configured to switch this switch to the open state, and the first switch to the closed state, on identification or detection of the overload.

If the first switch, which is configured to supply the first electrical load with the lower power range, is closed before the occurrence of the overload, then the drive circuit is configured to set both switches to the closed state on identification or detection of the overload.

The input voltage of the voltage supply arrangement may be configured to be higher than the typical input voltages which occur during operation, during a process in which the battery is being charged or when the voltage supply arrangement is being used in a mobile radio and the spatial arrangement of the antenna of the mobile radio with respect to a metallic body is disadvantageous. The drive circuit is thus configured such that the output voltage is detected and the second and/or the first switch are/is driven such that the output voltages for supplying the first electrical load occur exclusively in a permissible range and thus not above a predetermined voltage level of the voltage output. During an overvoltage, the second and/or the first switch may be switched to the open state.

The second switch may comprise a variable resistance, so that the output voltage falls as a result of the voltage drop across the resistance. The resistance can thus be set such that the first electrical load is still supplied with the required power, but is protected against an overvoltage. In accordance with Ohm's Law, the voltage drop is the product of the resistance value of the resistance and the current through the first electrical load. Accordingly, it may be advantageous for the second switch to comprise a resistance, since the first electrical load is still in operation and can be configured in such a manner that it is configured with little complexity to cope only with a voltage up to a predetermined permissible output voltage limit. This makes it possible to reduce the implementation costs.

In order to set the resistance of the second switch, the drive circuit can determine the output voltage of the voltage supply arrangement by means of a second voltage tap line. In another embodiment, the drive circuit can additionally determine the input voltage of the voltage supply arrangement by means of a first voltage tap line, and can determine a signal for controlling the switch, from the output voltage and the input voltage. In a further embodiment, the resistance of the first switch can be set in an analogous manner.

The voltage converter requires only a small amount of power when the current at the voltage converter output and at the voltage converter additional output is equal to zero. These power losses can be reduced further by the voltage supply arrangement, in a further embodiment, having a third switch and a third switch control line. When the first electrical load is being operated in the second power range, the third switch can be switched to an open state. When a second power range has been activated in order to supply the first electrical load, this therefore avoids the voltage converter making available a voltage in the first power range.

The voltage level which is provided from the voltage converter may be adjustable in order that the output voltage can be matched even more accurately to the requirements in the first power range. The voltage converter may also be configured such that it can be switched off in order to reduce power losses. Both can be achieved by linking the voltage converter to the drive circuit by means of a voltage converter control line.

Figure 2:
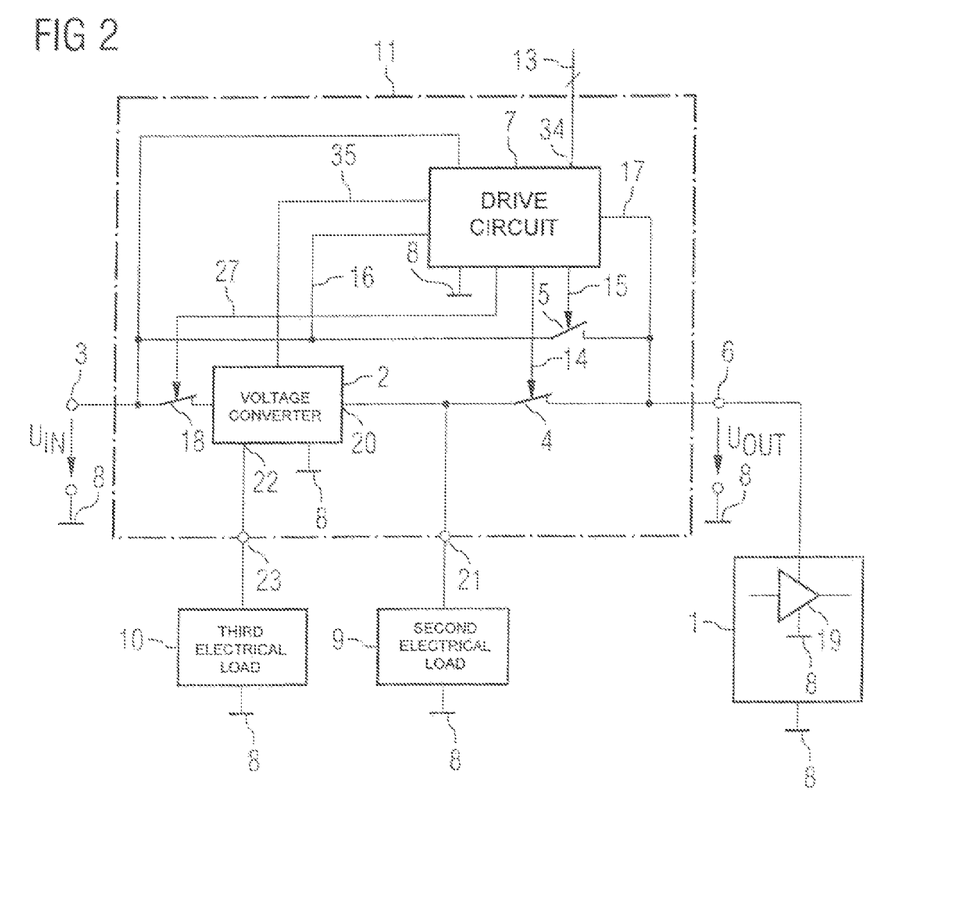
FIG. 2 illustrates a simplified schematic diagram of an example of a voltage supply arrangement for supplying a first electrical load and further loads.

FIG. 2 illustrates one exemplary embodiment of a voltage supply arrangement 11 for supplying a first, a second, and a third electrical load 1, 9, 10, respectively.

A voltage supply arrangement 11 is used to provide a voltage from a first power range in a first operating mode, and from a second power range in a second operating mode, to a first electrical load 1. The voltage supply arrangement 11 comprises a voltage converter 2, whose input side is coupled to a voltage input 3 of the voltage supply arrangement 11, and whose output side is coupled to a first connection of a first switch 4, which is connected to a second connection with a voltage output 6 of the voltage supply arrangement 11 for connection of a first electrical load 1. The voltage supply arrangement 11 also comprises a second switch 5, which is coupled at a first connection to the voltage input 3 and at a second connection to the voltage output 6, and a drive circuit 7, which is configured to set the first and the second switch 4, 5 to the first or the second operating mode, in response to a control signal.

The voltage output 6 of the voltage supply arrangement 11 is coupled by means of the second electrical switch 5 to the voltage input 3 of the voltage supply arrangement 11. The voltage output 6 is linked by means of the first switch 4 to the voltage converter output 20 of a voltage converter 2. The voltage converter 2 converts an input voltage which is applied to the input of the voltage supply arrangement 11 to a voltage converter output signal, which is produced at the voltage converter output 20.

The second electrical load 9 is connected by means of a further or second voltage output 21 of the voltage supply arrangement 11 to the voltage converter output 20 of the voltage converter 2.

The third electrical load 10 is coupled by means of an additional or third voltage output 23 of the voltage supply arrangement 11 to an additional voltage converter output 22 of the voltage converter 2. According to this exemplary embodiment, the voltage converter 2 thus supplies the second electrical load 9 and the third electrical load 10 with two different voltages.

The drive circuit 7 is linked via a first switch control line 14 to the first switch 4, and via a second switch control line 15 to the second switch 5.

A plurality of signal lines 13 are in this exemplary embodiment connected to a drive circuit input 34 of the drive circuit 7. The signal lines 13 are used to supply a signal to the drive circuit 7, so that the drive circuit 7 selects the operating mode of the voltage supply arrangement 11, and controls the first switch 4 and the second switch 5, in response to the signal.

The drive circuit 7 is configured to detect the input voltage by means of a first voltage tap line 16. This can be done by sampling the line at a point between the voltage input 3 and the first connection of the second switch 5. The drive circuit 7 is configured to detect the output voltage by means of a second voltage tap line 17 for this purpose. For this purpose, it has a second voltage tap line 17, which detects the output voltage at a point on the line between the second connection of the second switch 5 and the voltage output 6 of the voltage supply arrangement 11. The voltage may also be tapped off at the connections of the lines. If the output voltage is higher than a voltage range that is permissible for operation of the first electrical load 1, the resistance of the second switch 5, comprising a controllable resistance, is adjusted such that this results in the permissible voltage range not being overshot.

A third switch 18 is provided between the voltage input 3 of the voltage supply arrangement 11 and the input of the voltage converter 2. The third switch 18 can thus be opened and closed, as an alternative to closing and opening of the first switch 4, if the second electrical load 9 and the third electrical load 10 require electrical power exclusively when the operation of the first electrical load 1 requires a power in the second power range. A third switch control line 27 is provided in order to control the third switch 18.

The electrical power which is provided from the voltage converter may be adjustable. It may also be possible to select a power level of 0, that is to say with the voltage converter switched off. A voltage converter control line 35 for this purpose connects the voltage converter 2 and the drive circuit 7.

The first electrical load 1 is thus electrically supplied with power in the desired power range at the input voltage by closing the switch 5 or at the output voltage of the voltage converter 2 by closing the first switch 4. The first electrical load 1 is thus supplied in a very energy-efficient manner. A further advantage of the voltage supply arrangement 11 is that the first electrical load 1 is protected against overvoltages.

In one embodiment of a transmission arrangement, the modulator can be connected to a further voltage output and to at least one additional voltage output of the voltage supply arrangement.

A complex signal which is to be processed in the transmission arrangement may in one embodiment be represented in polar coordinates, that is to say in amplitude and phase. The amplitude and phase can be processed individually. The amplitude signal and the phase signal are generally joined together during the production of the signal to be transmitted from the antenna. The amplitude and the phase may be combined in a polar modulator. The amplitude and the phase are combined in a polar transmitter, and the modulator and the transmission amplifier as well as the power amplifier in the transmission amplifier are configured to process the signals on the basis of a polar transmitter principle.

The first and/or the second switch may be configured to modulate the amplitude of the signal to be transmitted by having a further control input for supplying the payload signal or a component of the payload signal, particularly when in the form of a controllable resistance. In one embodiment, the first switch may for this purpose be connected at its further control input by means of a fourth switch control line to the modulator, and/or the second switch may be connected at its further control input by means of a fifth switch control line to the modulator.

In one embodiment, the power amplifier comprises a bipolar transistor as an amplifying component and a controllable resistor, which is coupled to the base of the bipolar transistor and is configured to set the base current. A resistance control line connects the controllable resistance to the drive circuit. The setting of the base current results in the setting of the operating point of the bipolar transistor, and thus of the power provided from the power amplifier. This embodiment can be used in a transmission arrangement which is configured for the W-CDMA method, since, in the W-CDMA method, the transmission process is carried out in time windows, or slots, and a mean power amplifier power level is defined for each slot. One advantage of this embodiment is that the power in the first power range, and hence the power consumption of the transmission arrangement, are further reduced when carrying out the W-CDMA method.

Figure 3A:
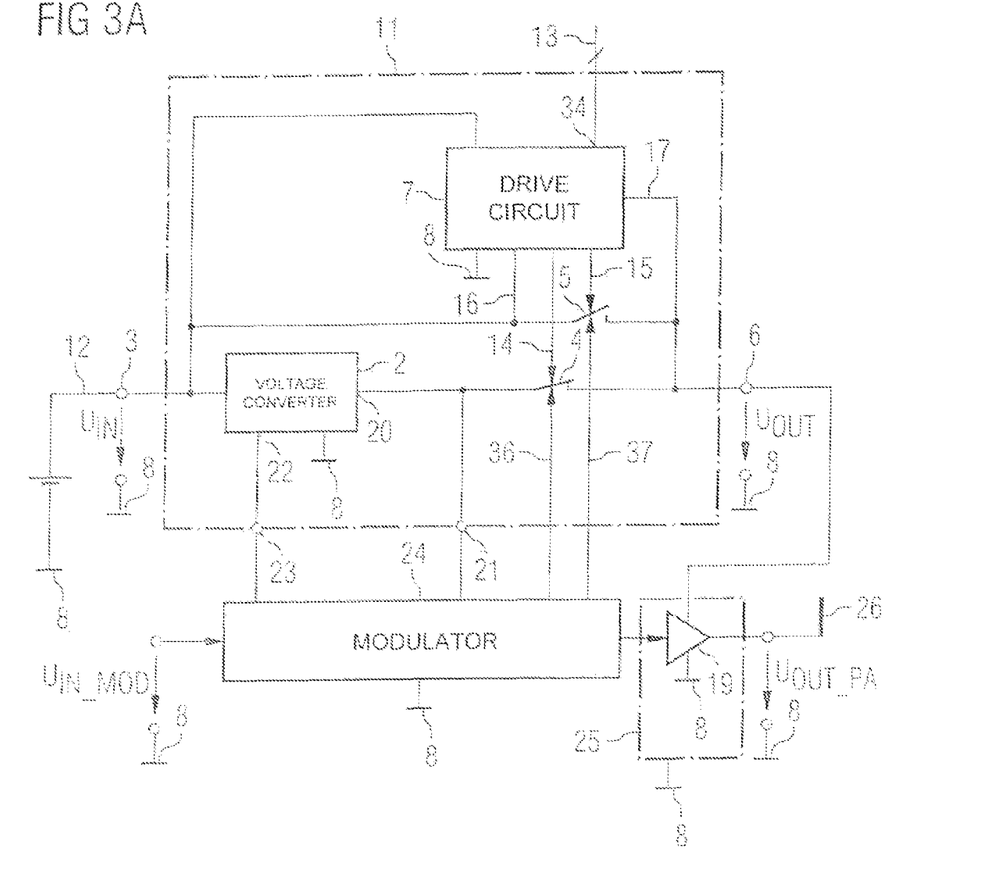
FIGS. 3A and 3B illustrate simplified schematic diagrams of an example of a voltage supply arrangement for supplying a transmission path of a transmission arrangement.

FIG. 3A shows one embodiment of the proposed voltage supply arrangement 11 for supplying a transmission arrangement. The transmission arrangement has the voltage supply arrangement 11 for supplying the transmission amplifier 25. The transmission amplifier 25 comprises a power amplifier 19. A modulator 24 is connected at its output to one input of the transmission amplifier 25, which is in turn coupled to an antenna 26.

The modulator 24 is connected to a further voltage output 21, and to an additional voltage output 23 of the voltage supply arrangement 11. The voltage output 21 is connected to a voltage converter output 20, and the voltage additional output 23 is connected to a voltage converter additional output 22 of a voltage converter 2.

At its input, the voltage converter 2 is linked to the voltage input 3 of the voltage supply arrangement 11, and is used to convert an input voltage to the voltage supply arrangement 11. The voltage converter output 20 is coupled via a first switch 4 to a voltage output 6 of the voltage supply arrangement 11. The voltage input 3 of the voltage supply arrangement 11 is in turn coupled via a second switch 5 to the voltage output 6 of the voltage supply arrangement 11. The transmission amplifier is connected to the voltage output 6 in such a manner that the power amplifier 19 is supplied at a supply input with the output voltage from the voltage supply arrangement 11.

A drive circuit 7 is connected by means of a first switch control line 14 to the first switch 4, and by means of a second switch control line 15 to the second switch 5. At its control input or control inputs 34, the drive circuit 7 receives, by means of the signal lines 13, a control signal which allows the drive circuit 7 to select the desired power range by closing the switch 4 or the switch 5.

The first switch 4 is closed in order to supply a voltage in the first power range to the transmission amplifier 25. The second switch 5 is closed in order to supply a voltage in the second power range to the transmission amplifier 25. The other switch is in each case open.

A battery 12 is connected to the voltage input 3 of the voltage supply arrangement 11.

The modulator 24 converts a payload signal $U_{IN\_MOD}$ to be transmitted and which is applied to an input to a modulated output signal. This output signal from the modulator 24 is converted by the transmission amplifier 25 to a signal $U_{OUT\_PA}$ to be transmitted by the antenna 26.

The voltage converter 2 converts the input voltage, which is applied to the voltage input 3, to a voltage which is produced at the voltage converter output 20, and to a further voltage which is produced at an additional voltage converter output 22.

The voltage converter 2 thus supplies two different supply voltages for supplying the modulator 24.

In this exemplary embodiment, the first power range is lower than the second power range. In this case, when the power demand for the transmission amplifier 25 is low, the transmission amplifier 25 is supplied with the output voltage from the voltage converter 2 by closing the first switch 4.

In the second power range, that is to say the higher-power range, the transmission amplifier 25 is coupled directly to the battery voltage by closing the switch 5. The transmission amplifier 25 is thus provided with the maximum possible power which is required between the mobile radio and the transmission station for some modulation types and for certain spatial circumstances.

The voltage converter 2 is in this example thus configured exclusively to supply voltage in a power range with low voltage values. In a power range with high voltage values, the transmission amplifier 25 obtains the electrical voltage directly from the input voltage, which is linked to the battery 12.

The first switch 4 is connected to the modulator 24 at a further control input by means of a fourth switch control line 36 and, by analogy, the second switch 5 is connected to the modulator 24 at its further control input by means of a fifth switch control line 37.

The energy which is stored in the battery 12 is thus used highly efficiently in this arrangement.

Figure 3B:
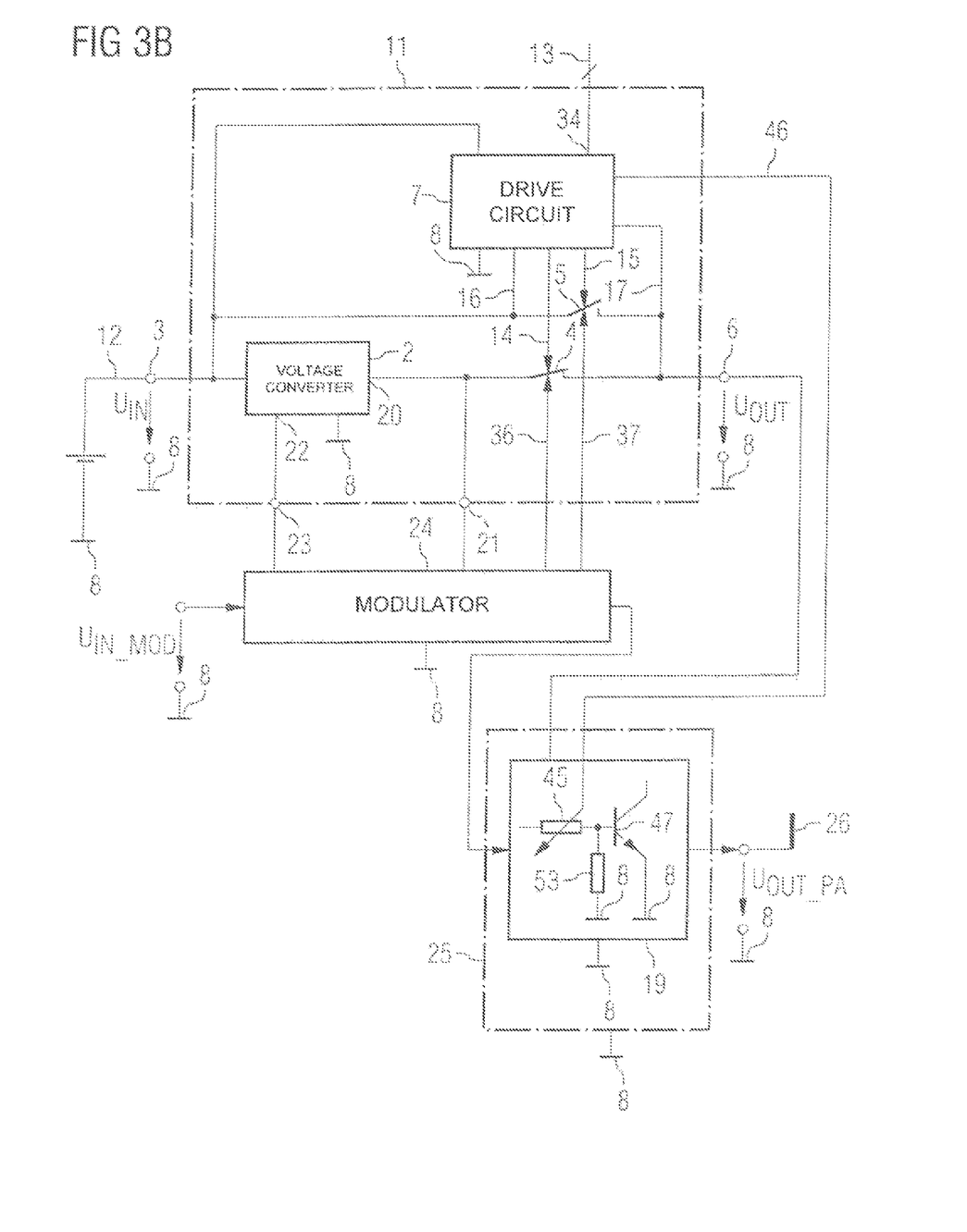

FIG. 3B illustrates an exemplary embodiment of a development of the voltage supply arrangement for supplying a transmission path in a transmission arrangement as shown in FIG. 3A. To the extent that the two circuits correspond in terms of components, circuitry and function, their description will not be repeated at this point. In addition, FIG. 3B has a bipolar transistor 47, a resistance control line 46, a controllable resistor 45 and a fixed resistor 53. The bipolar transistor 47 is an amplifying component of the power amplifier 19, and represents the central amplifier element of the power amplifier 19.

The controllable resistor 45 is coupled to the base of the bipolar transistor 47. The base is connected to the reference ground potential connection 8 by means of the fixed resistor 53. The emitter of the bipolar transistor 47 is coupled to the reference ground potential connection 8. A resistive divider, comprising the controllable resistor 45 and the fixed resistor 53, is used to set a base current, and hence an operating point of the bipolar transistor 47. The resistance control line 46 which controls the controllable resistor 45 is connected to a further output of the drive circuit 7.

Adjustment of the controllable resistor 45 results in adjustment of the operating current of the bipolar transistor 47 in the power amplifier 19, and thus the power which is provided from the power amplifier 19. This further reduces the power consumption of the transmission arrangement.

The first and/or the second switch may comprise controllable switches, which have only the open or closed states.

The first and/or the second switch comprise a controllable resistance, so that the first or the second switch has not only the two states open and closed.

The first and/or the second switch may each have an electronic switch, which comprises at least one control input, a first connection and a second connection. Alternatively, the first and/or the second switch may be in the form of micromechanical relays.

The first and/or the second switch may be in the form of linear regulators or a linear regulator, which linearly regulate or regulates an output voltage between two load connections in response to a voltage at a control input.

The electronic switch with or without the function of a controllable resistance and with or without the function of a linear regulator may comprise at least one diode or at least one bipolar transistor, or at least one field-effect transistor. The diode may be a positive-intrinsic-negative diode. One advantage of this solution is that this makes it possible to provide the first and/or second switch in a semiconductor body.

The field-effect transistor, for example, may be provided in order to produce the electronic switch has a sink connection, or drain, a source connection, and a control connection, or gate. When the voltage between the drain connection and the source connection is small, there is a linear relationship between this voltage and the current which flows through the drain connection. In this range, the path in the field-effect transistor between the drain connection and the source connection can be described to a good approximation as a resistance which can be varied between high values and low values electronically by variation of a voltage between the gate connection and the source connection. The high resistance values correspond to the state when the switch is open, and the low resistance values correspond to the state when the switch is closed. In the intermediate range, the switch acts as a controllable resistance. This may be used to produce a constant output voltage at the second connection of the electronic switch. In this embodiment, the electronic switch may thus comprise a linear regulator.

The field-effect transistor may be a metal oxide semiconductor field-effect transistor, or MOSFET for short. One alternative may be a junction field-effect transistor. The junction field-effect transistor can have an n-channel, that is to say the current charge carriers are electrons.

The first and the second switch may comprise at least one further transistor or a current source or a voltage source as well as at least one passive component such as a capacitor, a resistor, an inductance or a diode, in order to supply the switching elements with drive signals and in order to reduce voltage spikes during the switching processes.

The electronic switch may comprise at least one n-channel field-effect transistor and one p-channel field-effect transistor. In one embodiment of the electronic switch, an n-channel field-effect transistor and a p-channel field-effect transistor are connected in series. In one example, the series-connected field-effect transistors may be a normally-on n-channel MOSFET and a normally-on p-channel MOSFET.

The electronic switch may comprise a transmission unit with a control input, or transmission gate.

One embodiment of the electronic switch may have two field-effect transistors connected in parallel in a differential circuit. One embodiment of the electronic switch may be an n-channel MOSFET and a p-channel MOSFET connected in parallel, with both MOSFETs advantageously being normally-on MOSFETs.

The electronic switch may be in the form of a linear regulator which comprises a comparator and a p-channel MOSFET. The p-channel MOSFET may be used as a switch with the open and closed states, and as an electronically controllable resistance. In this embodiment, a first comparator input may be connected to the control input of the electronic switch. One output of the comparator may be connected to the control connection of the p-channel MOSFET. A load connection of the MOSFET may form the first connection of the electronic switch, and a further load connection of the MOSFET may form the second connection of the electronic switch. The second connection of the electronic switch may in this case be connected to the reference ground potential connection via a resistive divider, comprising a first and a second resistance. A second comparator input may be connected to a node of the resistive divider, which is located between the first resistor and the second resistor. In this embodiment of the electronic switch, it is set a voltage at the second connection of the electronic switch in response to a voltage which is applied to the control input of the electronic switch.

In this embodiment of the electronic switch, the output voltage of the voltage supply arrangement can be restricted to a permissible voltage if the input voltage of the voltage supply arrangement has an excessively high value.

For this purpose, the voltage at the control input of the electronic switch can be set to a maximum permissible voltage value if the output voltage of the voltage supply arrangement exceeds this maximum value.

This embodiment of the electronic switch which operates as a linear regulator may be used to increase the power of the power amplifier. A predetermined increase in the voltage at the control input of the electronic switch can be used to increase the output voltage of the voltage supply arrangement, which represents an operating voltage for the power amplifier, from a value of 0 to a value which is virtually the same as the input voltage of the voltage supply arrangement. The output power of the power amplifier may in this case be approximately proportional to the square of the output voltage of the voltage supply arrangement.

In one embodiment of a transmission method, the transmission process may be carried out in time slots. A first subscriber can transmit in one time slot and further subscribers can transmit in further time slots before the first subscriber can transmit again. During one time slot, the power amplifier can thus be supplied with a power such that the power is increased to a predetermined value starting from a rest state at the start of a time slot, and is reduced at the end of the time slot. This rise and fall of the power may be described as a pulse, or burst. This may be required, for example, in the GSM method. Thus, for this transmission method, the electronic switch comprises a linear regulator for selection of the power to be provided to the power amplifier.

This embodiment of the electronic switch can be used with the function of a linear regulator in order to modulate the output voltage of the voltage supply arrangement, which at the same time is the operating voltage for the power amplifier, such that the amplitude modulation is additionally applied to a phase-modulated input signal which has been amplified in a relevant power stage. The voltage which is applied to the control input of the electronic switch can be modulated for this purpose. In one embodiment, the modulation can be applied to the output stage, with the further stages being directly connected to the input of the voltage arrangement, and thus to the battery. In one embodiment, two or more stages of a polar amplifier in the polar modulator or in the polar transmitter can be connected to one or more suitable regulators, with the modulation being applied in this way.

The electronic switch with the function of a linear regulator may have a p-channel MOSFET in the form of a depletion type MOSFET. A power transistor in the power amplifier may be a field-effect transistor which is connected by its source connection to the reference ground potential connection. A power transistor may, however, also be a bipolar transistor, which is connected by its emitter connection to the reference ground potential. These two embodiments are advantageous in comparison to so-called floating operation, in which sources and emitters are not connected to the reference-ground potential, for thermal and radio-frequency reasons.

The first and the second switch may be physically identical. The second switch may be configured to be different to the first switch in order to make it possible for one of the two switches to carry out an additional function, such as protection against short-circuiting.

Figure 4A:
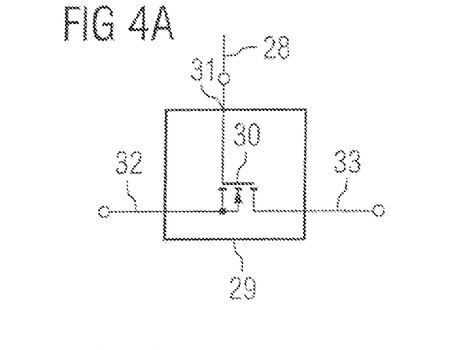
FIGS. 4A to 4D illustrate examples of embodiments of an electronic switch.

FIG. 4A illustrates one example of an embodiment of an electronic switch 29. This may be used as the first, the second and/or the third switch 4, 5, 18 in FIGS. 1, 2, 3A to 3B.

The first, second and/or third switch 4, 5, 18 in FIGS. 1, 2, 3A to 3B may be an electronic switch 29 with open and closed states. However, it may also be a variable resistance.

Both alternatives can be provided by a bipolar transistor or a circuit comprising bipolar transistors. It may be advantageous for one switch to be in the form of a p-channel metal oxide semiconductor field-effect transistor MOSFET, because the switch can be controlled with less power. A switch in the form of an n-channel MOSFET may be advantageous because the internal resistance is less owing to the greater mobility of electrons in comparison to holes in semiconductor materials such as silicon, germanium and gallium arsenide.

A MOSFET may be in the form of a depletion-type MOSFET. A MOSFET in the form of an enhancement type MOSFET is advantageous because the MOSFET is no longer switched on when the voltage between its gate connection and its source connection is 0 volts. A circuit arrangement comprising MOSFETs can also be provided, instead of a single MOSFET.

As an example of the first, second and/or third switch 4, 5, 18, but without any restriction to generality, FIG. 4A shows the electronic switch 29, comprising an n-channel enhancement type MOSFET 30. A control connection 31 of the electronic switch 29 is connected to a semiconductor switch control line 28, and the electronic switch 29 has a first and a second connection 32, 33, between which there is a controlled path. The semiconductor switch control line 28 may be the first, the second, the third, the fourth or the fifth switch control line 14, 15, 27, 36, 37 in FIGS. 1, 2, 3A and 3B.

Figure 4B:
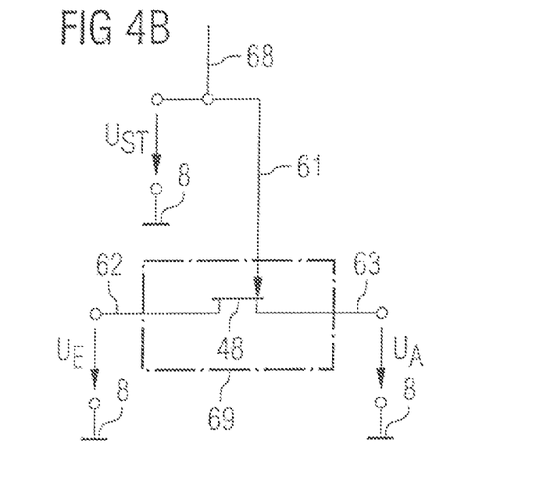

FIG. 4B shows a further exemplary embodiment of an electronic switch 69, which may be used as the first, the second and/or the third switch 4, 5, 18, respectively, in FIGS. 1, 2, 3A and 3B. The electronic switch 69 in FIG. 4B comprises a field-effect transistor 48. The field-effect transistor 48 has a source connection, a drain connection and a gate connection. The gate connection of the field-effect transistor 48 is connected to a gate connection 61 of the electronic switch 69, to which the semiconductor switch control line 68 is connected.

The field-effect transistor 48 shown in FIG. 4B may be a junction field-effect transistor. The junction field-effect transistor may be in the form of an n-channel junction field-effect transistor. In this embodiment, the field-effect transistor 48 is connected by its source connection to the second connection 63 of the electronic switch 69, and by its drain connection to the first connection 62 of the electronic switch 69.

When the voltage between the gate connection and the source connection of the field-effect transistor 48 is equal to the voltage between the drain connection and the source connection of the field-effect transistor 48, and is thus equal to the voltage at the first connection 62 of the electronic switch 69, then the electronic switch 69 is in a closed state. When the voltage between the gate connection and the source connection is less than a threshold voltage $U_P$, also referred to as a pinch-off voltage, then the electronic switch 69 is in an open state. When the voltage between the gate connection and the source connection is between the threshold voltage $U_P$ and the voltage between the drain connection and the source connection, then the field-effect transistor 48 acts as a controllable resistor.

Figure 4C:
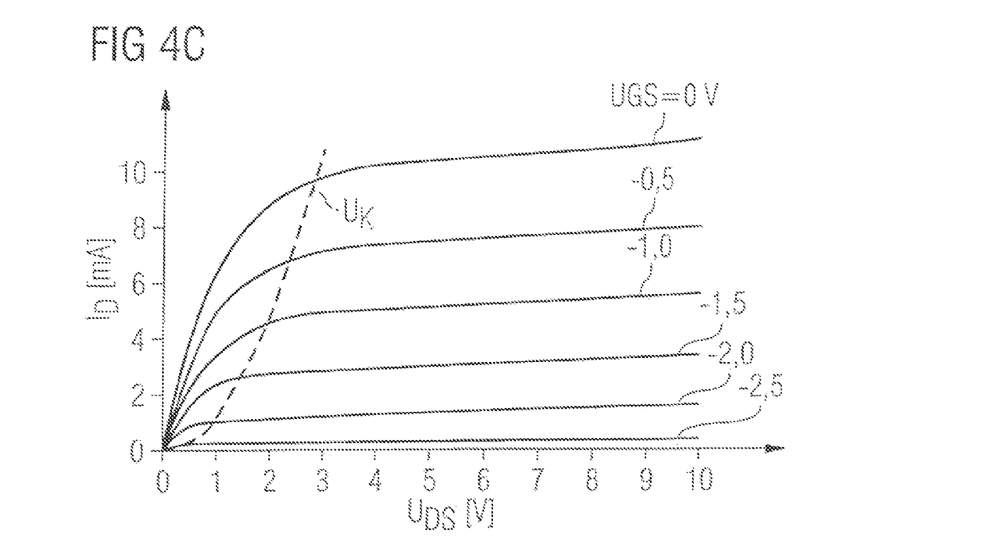

FIG. 4C illustrates a characteristic of the n-channel junction field-effect transistor based on one embodiment. This shows an output characteristic for which a drain current $I_D$, which flows through the drain connection of the n-channel junction field-effect transistor, is illustrated in response to a voltage $U_{DS}$ which is present between the drain connection and the source connection of the field-effect transistor. The family parameter for the various curves is a voltage $U_{GS}$ between the gate connection and the source connection of the field-effect transistor. A curve $U_K$ is also shown, which illustrates the transition from a parabolic relationship between the drain current $I_D$ and the voltage $U_{DS}$ between the drain connection and the source connection, to the saturation region.

Figure 4D:
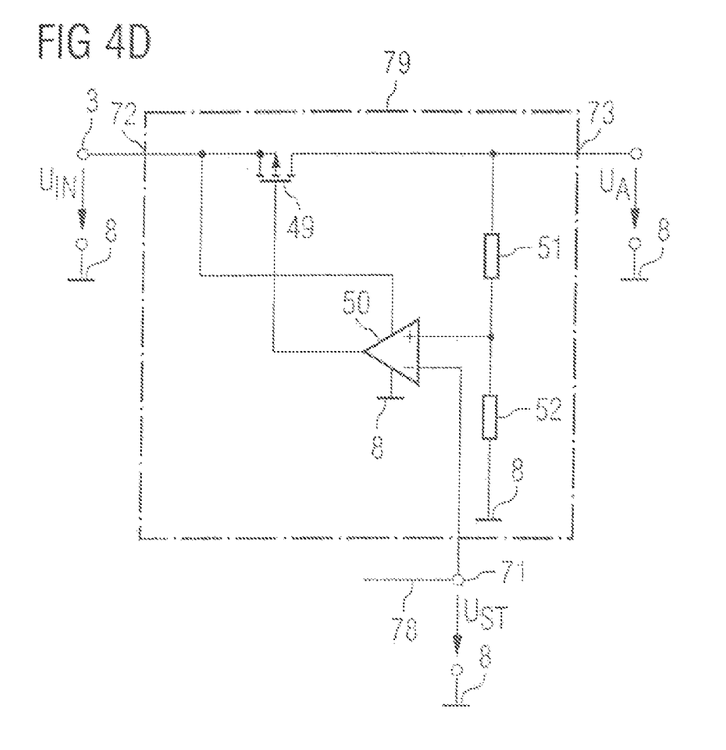

FIG. 4D illustrates one embodiment of an electronic switch 79 with a linear-regulator function. The electronic switch 79 comprises a p-channel MOSFET 49 and a comparator 50. The electronic switch 79 may be one embodiment of the second switch 5 in FIG. 1, 2, 3A or 3B.

The p-channel MOSFET 49 has a drain connection, a source connection, a substrate connection and a gate connection. The source and substrate connections of the p-channel MOSFET 49 are connected to the voltage input 3 of the voltage supply. A battery may be connected to this voltage input 3. The drain connection of the p-channel MOSFET 49 is connected to a second connection 73 of the electronic switch 79. The second connection 73 is connected to the voltage output 6 (which is not shown) of the voltage supply arrangement. A power amplifier can be connected to this voltage output 6. The voltage at the voltage output 6 is used in this embodiment as the operating voltage for the power amplifier.

The control connection of the field-effect transistor 49 is connected to one output of the comparator 50. In this embodiment, a voltage which is present at the gate connection 71 of the electronic switch 79 is connected to a negative input of the comparator 50. The drain connection of the field-effect transistor 49 is connected via a resistive divider, comprising a first resistor 51 and a second resistor 52, to the reference ground potential connection 8. A voltage at a node between the first resistor 51 and the second resistor 52 is connected to a positive input of the comparator 50. In order to operate the comparator 50, it is connected to the voltage input 3 of the voltage supply, and to the reference ground potential connection 8.

When the voltage $U_A$ at the second connection 73 of the electronic switch 79 falls, then the output of the comparator 50 becomes negative. In consequence, in this embodiment, the current through the field-effect transistor 49 can rise, so that the voltage $U_A$ at the second connection 73 rises, and reaches the predetermined value.

The output voltage of the second connection 73 of the electronic switch 79, which may be the second switch 5 in FIGS. 1, 2, 3A and 3B, can thus be adjusted in response to the control voltage $U_{ST}$.

Figure 5:
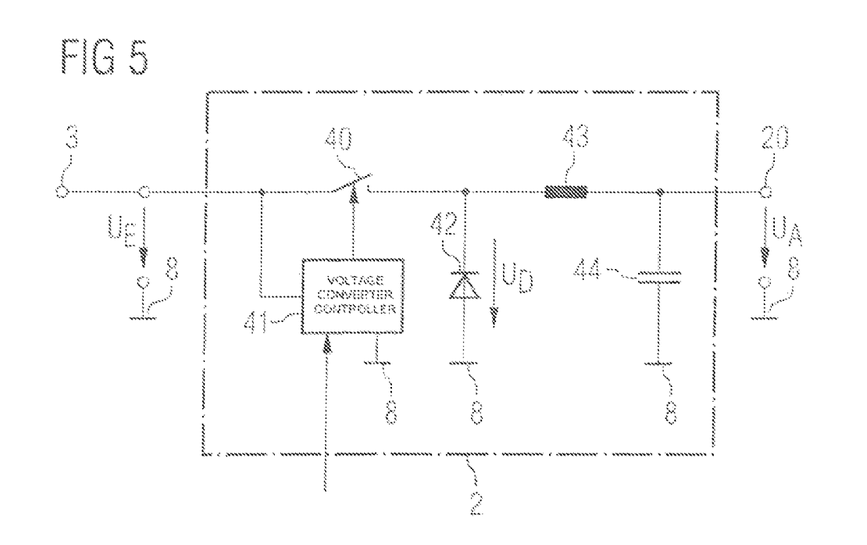
FIG. 5 illustrates an example of an embodiment of a voltage converter.

FIG. 5 illustrates an example of an embodiment of a voltage converter 2 which can be used in the embodiment shown in FIGS. 1, 2, 3A to 3B.

The voltage converter 2 in FIG. 5 comprises a step-down converter, which converts an input voltage $U_E$ to an output voltage $U_A$.

The input of the voltage converter 2 is coupled to the voltage input 3 of the voltage supply arrangement 11. The input of the voltage converter 2 is connected to a first connection of a voltage converter switch 40. A second connection of the voltage converter switch 40 is connected to a first connection of a voltage converter diode 42, and to a first connection of a voltage converter inductance 43. A second connection of the voltage converter diode 42 is linked to the reference ground potential connection 8.

The voltage converter diode 42 is connected such that, when the voltage $U_E$ at the input of the voltage converter 2 is positive, the second connection leads to a p-doped region, and the first connection leads to an n-doped region in the voltage converter diode 42.

A second connection of the voltage converter inductance 43 is connected to a first connection of a voltage converter capacitor 44, and is coupled to the voltage converter output 20 of the voltage converter 2. The second connection of the voltage converter capacitor 44 is connected to the reference ground potential connection 8.

The voltage converter switch 40 is clocked by a voltage converter controller 41 in order to set the output voltage $U_A$.

When the voltage converter switch 40 is in a closed state, the current through the voltage converter inductance 43 rises, and the voltage converter capacitor 44 is charged. The voltage $U_D$ across the voltage converter diode 42 is equal to the input voltage $U_E$. The voltage converter diode 42 is reverse-biased.

When the voltage converter switch 40 is in an open state, the current through the voltage converter inductance 43 decreases from its maximum value, which it reaches at the switching time. The current continues to charge the voltage converter capacitor 44, however. The voltage $U_D$ across the voltage converter diode 42 decreases. When the voltage $U_D$ becomes negative, then a current flows through the voltage converter diode 42.

The output voltage $U_A$ is primarily a function of an on and off switching time of the voltage converter switch 40, of a current flowing through the voltage converter output 20, of the input voltage $U_E$ and of an inductance value of the voltage converter inductance 43. Any ripple on the output voltage $U_A$ is primarily a function of the capacitance of the voltage converter capacitor 44.

The two switches and the drive circuit may be formed in three dedicated semiconductor bodies. The two switches and the drive circuit can be produced together in one semiconductor body, because this reduces the number of contacts.

The voltage converter can likewise be produced in a dedicated semiconductor body. In an alternative embodiment, a voltage converter which already exists in an overall system such as a mobile radio can be used to provide a voltage.

In a further embodiment, the voltage converter, the two switches and the drive circuit are integrated in a common semiconductor body.

The components may also be provided in one semiconductor body, which comprises a central power/battery management circuit and supplies the additional modules in a mobile radio.

In an alternative embodiment, the two switches and the drive circuit are integrated in a hybrid or monolithic form in a semiconductor body in the module in order to provide a decentralized power supply for a module.

In a further embodiment, the power amplifier is integrated together with at least the two switches and the voltage converter in one semiconductor body.

Complementary metal oxide semiconductor CMOS, bipolar complementary metal oxide semiconductor BICMOS, double diffused metal oxide semiconductor DMOS or laterally diffused metal oxide semiconductor LDMOS may be used as integration techniques for the switches, for the drive circuit or for the voltage converter, and for the entire voltage supply arrangement.

For other developments of the voltage supply arrangement, reference is made to the dependent claims.

In one embodiment of the method, the input voltage is initially produced. This input voltage is applied to the voltage converter, which converts it to a different voltage, which is produced by it at its voltage converter output.

One of the two voltages that are produced may then be made available at the voltage output of the voltage supply arrangement, depending on the switch position of the two switches. The first electrical load to be supplied can be connected to the voltage output.

The setting as to which output voltage and/or the power range in which an output voltage is made available at the voltage output may be achieved by means of two switches and one drive circuit. If only the first switch is closed, then the voltage which is made available by the voltage converter may be then applied to the voltage output of the voltage supply arrangement. If only the second switch is closed, then the input voltage to the voltage supply arrangement may be applied to the voltage output of the voltage supply arrangement.

One advantage of this method is that the first electrical load can be linked to a supply with different power ranges. Generally, only low power losses occur in the second power range, since the switches, lines, connections and drive circuit are designed to have low losses.

In the first power range, losses occur primarily during the voltage conversion. Since the voltage converter provides a voltage within a restricted power range, it can be configured specifically for this power range, and thus to be particularly energy-efficient.

In one embodiment, a power amplifier can be supplied with an output voltage that is produced at the voltage output.

In one exemplary embodiment, in the case of an application in a wireless communication appliance, the two switches can be driven such that the first switch is closed and the second switch is open, in order to couple the power amplifier to the voltage input of the voltage supply arrangement for transmission using the GSM method, and the first switch is closed and the second switch is open in order to couple the power amplifier to the voltage converter output for transmission using the W-CDMA method.

In another embodiment, the output power of the power amplifier is varied from a low value to a high value using a method whose timing is predetermined exactly, such that the first and/or the second switch, comprising a controlled resistance or resistances, are/is driven such that the power that is supplied to the power amplifier rises appropriately. This embodiment is advantageous in a transmission arrangement configured for the GSM method.

In one embodiment, a battery voltage can be provided at the voltage input by means of a battery.

In another embodiment, the first switch can be closed, and the second switch can be opened, in order to provide electrical power to the first electrical load in a low power range, and the second switch can be closed, and the first switch opened, in order to provide electrical power in a high power range.

The identification of an overload in the first electrical load can lead to opening of the switch by means of which the first electrical load is supplied with voltage at this time.

In order to identify an overvoltage, the input voltage and/or the output voltage of the voltage supply arrangement can be sampled, and the resistance of the second and/or first switch, comprising a controllable resistance, can be adjusted in such a manner that the output voltage is maintained within a predetermined permissible range, so that no overvoltage occurs at the voltage output.

In one embodiment, one or more control signals is or are supplied to the input side of the drive circuit, and the first and the second switch are driven by the drive circuit in such a way that the first electrical load is supplied with electrical power corresponding to the control signal or the control signals.

Non-overlap times are advantageously set in order to prevent one of the two switches from being closed before the other switch has been opened.

With regard to other developments of the method, reference is made to the dependent claims.

In summary, the proposed principle can provide:
  better efficiency of energy utilization compared with a voltage supply arrangement with a voltage converter and without switches,
  a cost-effective solution for a voltage supply,
  a design of the voltage converter for exclusively one power range, which allows an implementation that saves chip area and thus cost, a volume-saving implementation overall, the capability to protect the first electrical load against overloading, the capability to supply further electrical loads from the voltage converter and thus to provide a highly flexible voltage supply arrangement.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that layers and/or elements depicted herein are illustrated with particular dimensions relative to one another (e.g., layer to layer dimensions and/or orientations) for purposes of simplicity and ease of understanding, and that actual dimensions of the elements may differ substantially from that illustrated herein.

What is claimed is:

1. A voltage supply arrangement which can be operated in a first or in a second operating mode and is configured to provide a voltage in the first operating mode from a first power range, and from a second power range in the second operating mode, to a first electrical load, the voltage supply arrangement comprising:
   a voltage converter whose input is coupled to a voltage input of the voltage supply arrangement in order to receive an input voltage and provide a converted voltage at a voltage converter output to a first connection of a first switch;
   the first switch, which is coupled at a second connection to a voltage output of the voltage supply arrangement, wherein the voltage output is configured for connection of the first electrical load to the voltage supply arrangement;
   a second switch, which is coupled at a first connection to the voltage input of the voltage supply arrangement and at a second connection to the voltage output of the voltage supply arrangement, wherein the voltage output of the voltage supply arrangement is connected by means of the first switch to the voltage converter output and the voltage output of the voltage supply arrangement is connected by means of the second switch to the voltage input of the voltage supply arrangement; and
   a drive circuit, which has at least one drive circuit input for supplying at least one control signal, coupled at a first output to a control input of the first switch and at a second output to a control input of the second switch, and is configured to drive the first and the second switch in response to the at least one control signal.

2. The voltage supply arrangement of claim 1, wherein the voltage converter comprises a clocked DC/DC voltage converter and is configured to provide a predetermined constant output voltage at the voltage converter output.

3. The voltage supply arrangement of claim 1, wherein the drive circuit is configured to provide electrical power to the first electrical load,
   wherein in the first operating mode, the first switch is closed and the second switch is open, and
   wherein in the second operating mode, the first switch is open and the second switch is closed.

4. The voltage supply arrangement of claim 2, wherein the first power range comprises lower voltages than the input voltage, and the voltage converter is configured to provide at the voltage converter output the predetermined constant output voltage, which is less than the input voltage.

5. The voltage supply arrangement of claim 1, wherein the voltage input of the voltage supply arrangement is coupled to a battery in order to supply a battery voltage.

6. The voltage supply arrangement of claim 1, wherein the first or the second switch or both comprise a controllable resistor or resistors.

7. The voltage supply arrangement of claim 1, wherein the first or the second switch or both comprise one of a unipolar transistor, a bipolar transistor or a positive-intrinsic-negative diode.

8. The voltage supply arrangement of claim 1, wherein the first or the second switch or both comprise a linear regulator.

9. The voltage supply arrangement of claim 1, wherein the drive circuit is connected at the first output by means of a first switch control line to the control input of the first switch, and is connected at the second output by means of a second switch control line to the control input of the second switch.

10. The voltage supply arrangement of claim 1, wherein the first electrical load comprises a power amplifier having a supply input connected to the voltage output of the voltage supply arrangement, wherein the output voltage at the voltage output is provided to the supply input of the power amplifier.

11. The voltage supply arrangement of claim 10, wherein the voltage supply arrangement is configured to supply the power amplifier in the second operating mode for high transmission power levels, and to supply the power amplifier with low transmission powers in the first operating mode for comparison with the second operating mode.

12. The voltage supply arrangement of claim 1, wherein the voltage converter output is coupled to a further voltage output of the voltage supply arrangement for connection of a second electrical load.

13. The voltage supply arrangement of claim 1, wherein the voltage converter is coupled from at least one additional voltage converter output to at least one additional voltage output of the voltage supply arrangement for connection of at least a third electrical load, and the magnitude of the voltage at the at least one additional voltage converter output differs from the magnitude of the voltage at the voltage converter output.

14. The voltage supply arrangement of claim 1, wherein the drive circuit is configured in such a manner that the first switch and the second switch are not closed at the same time.

15. The voltage supply arrangement of claim 1, wherein the drive circuit comprises an overload detector for the first electrical load, so that the first or the second switch or both are open when an overload is identified.

16. The voltage supply arrangement of claim 1,
   wherein the drive circuit is coupled by means of a second voltage tap line to the voltage output in order to sample the output voltage, and
   wherein the drive circuit is coupled to the first or to the second switch or both in order to drive the first or the second switch or both, and is configured in such a manner that the voltage supply arrangement provides the output voltage within a predetermined permissible range at the voltage output.

17. The voltage supply arrangement of claim 1, wherein the voltage supply arrangement is used in a wireless communications device.

18. A voltage supply arrangement which can be operated in a first or in a second operating mode and is configured to provide a voltage in the first operating mode from a first power range, and from a second power range in the second operating mode, to a first electrical load, comprising:
a voltage input of the voltage supply arrangement operable to supply an input voltage;
a voltage output of the voltage supply arrangement;
a voltage converter operable to convert the input voltage to a voltage converter output voltage;
a first switch configured for connecting the voltage converter output voltage to the voltage output;
a second switch configured for connecting the input voltage to the voltage output; and
a drive circuit configured for selection of the first or second operating mode in response to a drive circuit control signal, configured to control operations of the first and the second switches.

19. The voltage supply arrangement of claim 18, wherein the drive circuit controls the first and second switches such that the voltage converter output voltage is provided at the voltage output in the first operating mode, and the input voltage is provided at the voltage output in the second operating mode.

20. The voltage supply arrangement of claim 18, wherein the first or the second switch or both comprise a controllable resistance.

21. The voltage supply arrangement of claim 18, wherein the first or the second switch or both comprise a linear regulator.

22. The voltage supply arrangement of claim 18, wherein the voltage converter provides the voltage converter output voltage at first and second voltage outputs of the voltage supply arrangement for connection of first and second electrical loads, respectively.

23. The voltage supply arrangement of claim 18, wherein the voltage converter provides first and second voltage converter output voltages at one or more voltage outputs of the voltage supply arrangement for connection of at least one third electrical load, and wherein the magnitude of the second voltage converter output voltage differs from the magnitude of the first voltage converter output voltage.

24. A method for producing a voltage for a first electrical load in a first or in a second power range, comprising:
producing an input voltage at a voltage input which is coupled to an input of a clocked DC/DC voltage converter and to a first connection of a second switch;
converting a voltage at the input of the voltage converter to a voltage at a voltage converter output by means of the voltage converter, which is coupled at the voltage converter output to a first connection of a first switch; and
driving the first and the second switch in response to at least one control signal such that the second switch is open and the first switch is closed in order to produce a voltage in the first power range, and the first switch is open and the second switch is closed in order to produce a voltage in the second power range, in such a manner that the first electrical load is supplied with an output voltage at a voltage output which is coupled to a second connection of the first switch and to a second connection of the second switch, and is used for connection of the first electrical load.

25. The method of claim 24, comprising:
supplying a power amplifier with the output voltage which is produced at the voltage output.

26. The method of claim 24, comprising:
producing a battery voltage using a battery, to supply the voltage input.

27. The method of claim 24, comprising:
controlling the first and the second switch such that the first and the second switch are not closed at the same time.

28. The method of claim 24, comprising:
opening the first switch and closing the second switch to supply the input voltage to the first electrical load in the second power range; and
opening the second switch and closing the first switch to supply a voltage to the first electrical load in the first power range, the first power range having lower voltages than the input voltage.

29. The method of claim 24, comprising:
identifying an overload of the electrical load; and
opening the first or the second switch or both when an overload is identified.

30. The method of claim 24, comprising:
sampling the output voltage produced at the voltage output of the voltage supply arrangement; and
controlling the resistance of the second or first switch or both to maintain the output voltage within a predetermined permissible voltage range.

31. The voltage supply arrangement of claim 1, wherein the first switch, the second switch or both further comprise one or more of a resistor, a current sensor, and a means for detecting a current, connected in series with the first switch, the second switch or both.

32. The voltage supply arrangement of claim 1, wherein the voltage supply arrangement comprises a third switch that is provided between the voltage input of the voltage supply arrangement and the input of the voltage converter.

33. The voltage supply arrangement of claim 18, wherein the second switch is coupled at a first connection to the voltage input of the voltage supply arrangement and at a second connection to the voltage output of the voltage supply arrangement, wherein the voltage output is connected by means of the first switch to the voltage converter output and the voltage output of the voltage supply arrangement is connected by means of the second switch to the voltage input of the voltage supply arrangement; and
the drive circuit is configured to detect the input voltage by means of a first voltage tap line, wherein a voltage at a node between the voltage input and the first connection of the second switch is sampled, and wherein a resistance of the second switch is adjusted to provide the voltage output within a predetermined voltage range.

34. The voltage supply arrangement of claim 18, wherein the first electrical load comprises a power amplifier having a supply input connected to the voltage output of the voltage supply arrangement, and wherein the output voltage at the voltage output is provided to the supply input of the power amplifier.

35. The method of claim 24, further comprising
detecting the input voltage by means of a first voltage tap line, wherein a voltage at a node between the voltage input and the first connection of the second switch is sampled; and adjusting a resistance of the second switch to provide the voltage output within a predetermined voltage range.

36. The method of claim 24, wherein the first electrical load comprises a power amplifier having a supply input connected to the voltage output of the voltage supply arrangement, and wherein the output voltage at the voltage output is provided to the supply input of the power amplifier.

* * * * *